April 10, 1934.  R. A. ASCHENBRENER  1,954,582
BUILDING INSULATION
Original Filed March 11, 1929  2 Sheets-Sheet 1

INVENTOR.
Rudolph A. Aschenbrener
BY
Erwin, Wheeler & Woolard
ATTORNEYS

April 10, 1934.   R. A. ASCHENBRENER   1,954,582
BUILDING INSULATION
Original Filed March 11, 1929   2 Sheets-Sheet 2
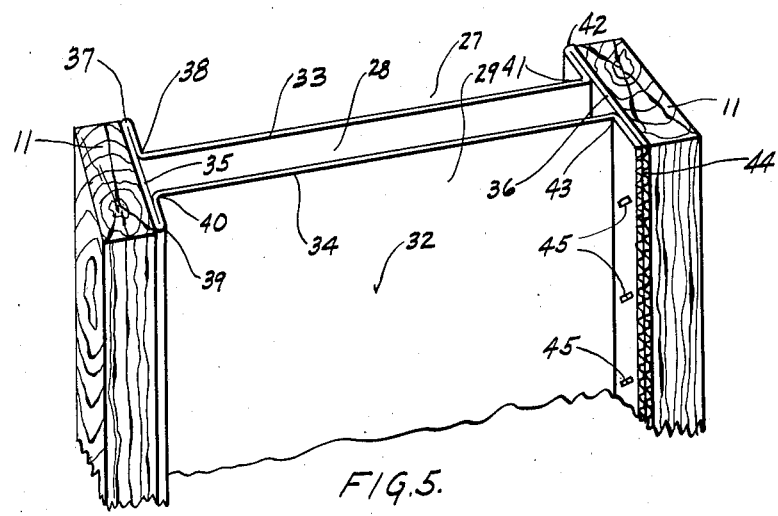
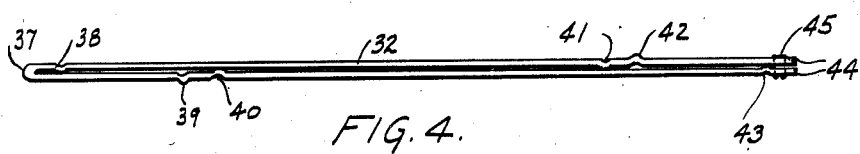
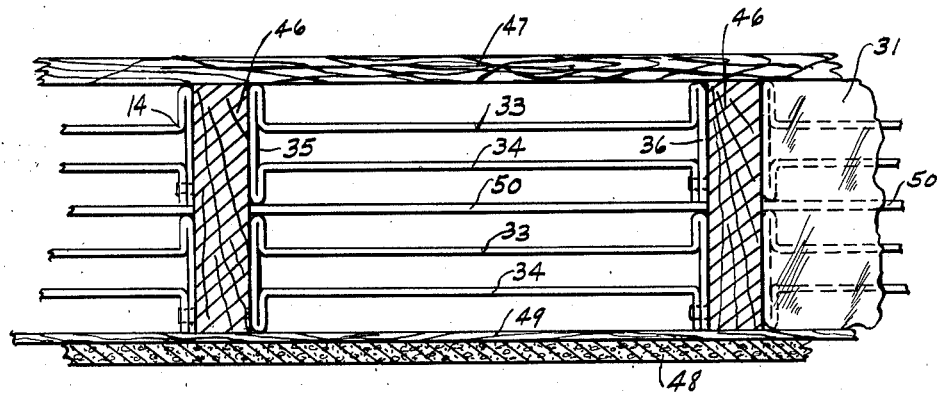
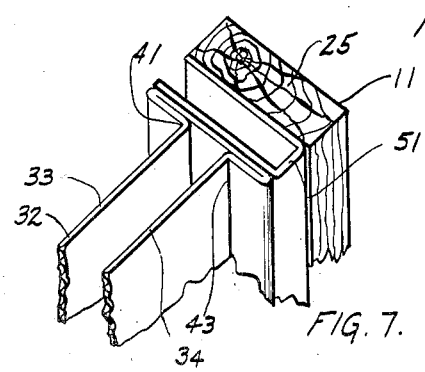
INVENTOR.
Rudolph A. Aschenbrener
BY
Erwin, Wheeler & Woolard
ATTORNEYS Patented Apr. 10, 1934

1,954,582

UNITED STATES PATENT OFFICE 1,954,582

BUILDING INSULATION

Rudolph A. Aschenbrener, Milwaukee, Wis., assignor to The Triple Insulaire Co., Milwaukee, Wis., a corporation of Wisconsin Application March 11, 1929, Serial No. 346,035
Renewed September 8, 1933

9 Claims. (Cl. 20—4)

My invention relates to improvements in building insulation.

The objects of my invention are to provide insulation comprising sheet corrugated paper board so shaped and creased as to be easily formable into a unit for installation between frame members of a building so as to gain the most efficient use of air space insulation in walls and partitions of buildings; to provide insulation material in flat sheet form, easy and economical of shipment, and easy of manipulation; to provide a unitary insulation element for installation by comparatively unskilled labor and still provide for an insulation which will effectively take care of all conditions to be found in various types of building construction.

More particularly stated it is the object of my invention to form sheets of corrugated paper board provided with creases to facilitate formation of the flat or folded sheets into insulation units which will fit between frame members of a building and, in conjunction with the wall material secured to the frame members, form a plurality of air spaces providing high insulating value in the wall construction.

In the drawings:

Figure 4 is an end elevation of a piece of my insulation flattened out for shipment.

Figure 5 is a perspective of my preferred form of insulation unit in place between studding in a wall.

Figure 6 is a vertical section through a floor showing an installation of several units between joists to secure additional insulation at this critical point.

Figure 7 is an isometric view of a portion of one of my units and a shim for supplementing said unit where unusual distance between studding is encountered.

Like parts are identified by the same reference characters throughout the several views.

I have found that corrugated paper board possesses advantageous characteristics such as a certain amount of springiness and stiffness which adapts it admirably to use as material for my insulation but many forms of sheet material may be used to good advantage in carrying out my invention which relates less to the inherent insulating value of the material used than it does to the manner in which I form my material to provide effectively for air space insulation and also provide for ease and economy of shipment and efficient installation.

Figure 1:
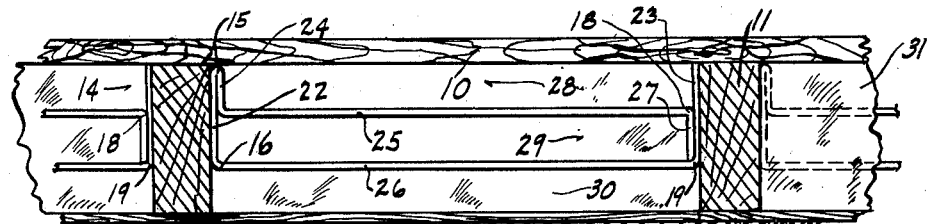
Figure 1 is a horizontal section through a portion of a frame dwelling wall provided with one form of my insulation units.
Figure 2:
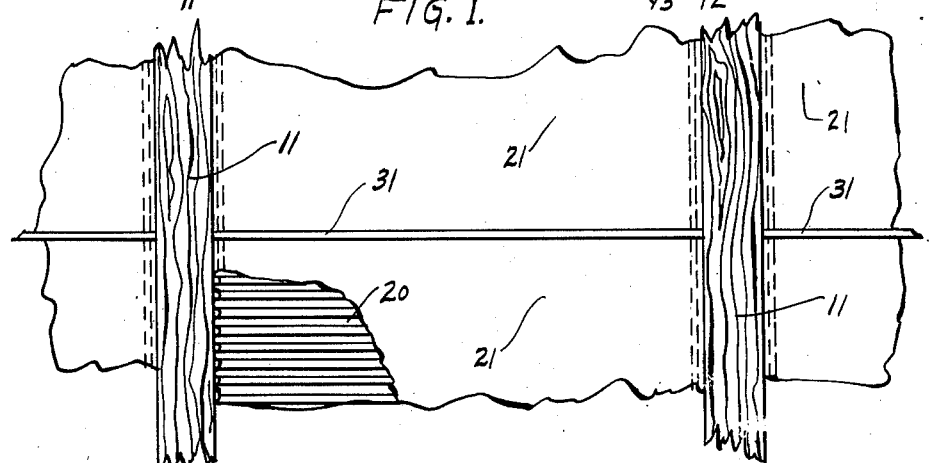
Figure 2 is a side elevation of the same wall shown in Figure 1 with a portion of the outer surface of one of my insulation units cut away to exhibit the character of the material used therein.
Figure 3:
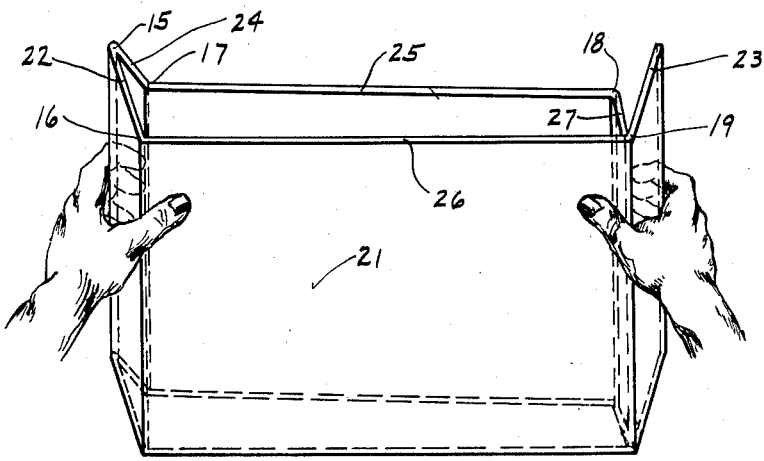
Figure 3 is a perspective of a unit of my insulation being formed in the hands of a workman.

Referring to the drawings, Figures 1 to 3 show one form of my insulation installed,—it being installed in a wall wherein sheathing 10 is secured upon one side of studding 11 and lath 12 covered with plaster 13 is secured upon the other side thereof in the conventional manner to provide air space 14 between the sheathing and the lath and plaster which was until recently considered ample insulation.

I have found that division of the large 3½" or 4" air spaces 14, if divided into a plurality of air spaces for the reduction of convection currents results in a much more efficient insulating barrier between the heated interior of a house and the exterior and since ease of transportation of the insulation material to the place where the building is to be erected and ease of manipulation of the insulation material into a form readily receivable into the wall spaces of the building is of extreme importance my invention is of major significance in meeting the problem of efficiently dividing the intrawall spaces of a building.

A piece of corrugated paper board formed preferably in lengths of 3 feet or 4 feet for convenient handling and creased along lines 15 or 16 and folded on one of said lines to provide a double thickness of corrugated board material provides an easily handlable unit for storage or shipment.

The same operation which provides the crease for folding at 15 or 16 likewise may provide creases 17, 18 and 19 which are parallel to the creases 15 and 16 and extend transverse to the convolutions or corrugations 20 of the internal plies of the corrugated paper board. This is not absolutely essential to the successful use of my insulation units but it will be found that if the creases are made parallel to the convolutions a less springy and less effective insulation unit will result.

It will be understood that the creases which are indicated at 15 to 19, inclusive, enable the workman, as shown in Figure 3, to fold the insulation unit 21 and slip it between studding 11 to abut the sheathing 10 as indicated in Figure 1 and the springiness of the folds along the lines 15 to 19, inclusive, will retain the insulation unit in position indefinitely unless moisture or other climatic or accidental means break down the vitality of the corrugated board. It will of course be possible to forestall this by nailing or gluing the insulation unit into place.

As seen in Figure 1 my insulation unit in its final position in the wall provides flange members 22 and 23 to abut the studding 11. A reverse fold 24 spaces a web of corrugated board 25 from the sheathing 10 and also spaces the web 25 from web 26 which spans the distance between the margins of the end flanges 22 and 23. The spacer flange 27 likewise spaces the web 25 from the web 26.

To assist in the effective baffling of convection currents in spaces 28, 29 and 30, I provide headers 31 across the ends of the insulation units 21 effectively closing off the passage of air currents vertically through the walls. These headers are inserted at the top of each unit 21 of insulation and the next unit may be placed upon it without any particular adjustment or means of securing it in place since the lath and plaster placed upon the one side after insertion of the insulating units will securely hold the entire assembly in place.

In some installations where particular means for maintaining my insulation units in vertical position is desired or required, I provide a special form of folded corrugated board unit 32 formed as indicated in Figures 4 and 5. This form of unit is likewise provided with spaced webs 33 and 34 spanning the distance between the end flanges 35 and 36 which, as in the insulation unit heretofore described, abut the studding 11. These flanges 35 and 36 however are coextensive with the faces of the studding 11 and are designed to be contiguous to the sheathing and to the lath and plaster.

This form of insulation unit may be changed as indicated in Figure 4 in a double thickness of flat corrugated board folded at 37 and creased at 38, 39, 40, 41, 42 and 43 and the free end portions 44 are stapled together by means of staples 45 so that the flat unit as shown in Figure 4 may be formed as shown in Figure 5 by the squeezing and forming pressure of a workman's fingers as exemplified in Figure 3. It will be noted that either of the units 21 or 32 heretofore described form a triple air space in conjunction with an ordinary wall of a frame building. Unit 32 is probably best adapted for use in conjunction with floor and ceiling construction of the type shown in Figure 6, where joists 46 surmounted by floor 47 and sealed with a ceiling composed of plaster 48 and lath 49 leave a space within which two units of insulation 32 interspersed with headers 50 provide a thick space insulating construction of particular value in inter-floor spaces where heat losses are particularly detrimental.

Although standardized construction in framed buildings has limited the number of standard stud spaces it is obvious that provision must be made for variation in distances between centers of studding. Much of the variation found in studding by reason of crookedness or inaccuracies of mill operation in the formation of studding may be taken care of in the use of my improved insulation by the inherent flexibility of the folds along the creased lines indicated in the drawings.

However where unusual distances between studding are encountered a shim 51 may be provided as shown in Figure 7 to supplement any one of my units of insulation and provide in its inherent springiness of form an adequate supplement to the span of the regular unit.

I claim:

1. A building unit comprising a unitary sheet of folded material provided with spaced crease lines whereby centripetal pressure upon opposite edges of the folded sheet will cause an adjustment of the sheet material to the form of a geometrical figure open in the center constituting an air cell for heat insulation, said geometrical figure being provided with lateral extensions to abut surfaces of a building and provide between said extensions and between said building surfaces and said geometrical figure further insulating air cells.

2. A new article of manufacture comprising a sheet of material for shipment in flat form and creased to provide spaced webs abutting interior spaced portions of opposed side flanges disposed at an angle to the webs when the article is folded along said creases.

3. A new article of manufacture comprising a sheet of corrugated board wherein the corrugations extend laterally of the sheet, parallel creases extending in spaced relation longitudinally of the sheet whereby to provide lines for folding to form spaced webs provided with side flanges to space the webs from each other.

4. A new article of manufacture including a folded sheet of material having the free edges opposite the fold secured together, said material being provided with creases forming fold lines in the material parallel with said fold defining with said fold and secured edges two opposed sides whereby upon compression upon the folded and secured edges of the material the sheet will form a substantially quadrilateral figure in cross section, said material being also provided with creases adjacent said sides of the figure defining portions adjacent said sides whereby squeezing action adjacent the sides will off-set from the ends of said sides the remainder of said material of said figure in the form of webs substantially normal to said short sides of the quadrilateral form.

5. A combination with a building wall providing spaced frame members and exterior and interior wall surfacing, of an insulating unit of sheet material providing flange members respectively contiguous to the frame member and abutting the exterior and interior wall surfacing, and spaced parallel webs integral with the flange members and spanning the space between the frame members.

6. A new article of manufacture comprising a strip of material medially folded upon itself and secured along two margins parallel with the line of fold to form opposed sheets, said strip having flexion inducing lines of weakness parallel to the fold line, one of which is in one sheet adjacent the connected margins, one of which is in the opposing sheet adjacent said fold line, and the remainder of which comprise two pairs disposed with one pair in each sheet between its transverse center line and the single weakness line, whereby to allow the sheets to be shaped by marginal compression into a general form of a hollow I beam with the portions between each pair of folds and the adjacent single fold constituting the outer end member of the beam.

7. A new article of manufacture including a medially folded sheet of material having the free edges most distant from the fold secured together, creases forming fold lines in the material parallel with said fold, and adapted upon compression upon the folded and secured edges of the material to allow the sheet to form a substantially quadrilateral figure in cross-section, said article having two short opposed sides, and an additional crease adjacent each short side of the figure whereby a squeezing action adjacent the short side will offset the long sides of said figure in the form of webs substantially normal to said short sides of the quadrilateral form.

8. An insulating unit comprising a pair of web members flexibly connected by a flange member, the ends of said web members being movable laterally relative to adjacent ends, whereby the web members may be positioned in either of two planes, thereby adapting the unit for shipment in flat packages and for positioning in a building wall.

9. An insulating unit comprising a pair of web members having their corresponding ends flexibly connected by flange members, the ends of said web members being movable laterally relative to their corresponding ends when said web members are flexed on said flange members, thereby adapting the unit for shipment in a flat package and for positioning in a building wall.

RUDOLPH A. ASCHENBRENER.